United States Patent [19]

Kosnoff

[11] 4,184,076

[45] Jan. 15, 1980

[54] ULTRAVIOLET WATER PURIFIER

[75] Inventor: Melvin N. Kosnoff, Goshen, Ind.

[73] Assignee: Conviron, Inc., Goshen, Ind.

[21] Appl. No.: 940,762

[22] Filed: Sep. 8, 1978

[51] Int. Cl.$^2$ .......................................... G01N 21/24
[52] U.S. Cl. .................................. 250/437; 250/436; 250/438
[58] Field of Search ................ 250/432 R, 435, 436, 250/437, 438, 455, 504; 21/102 R, DIG. 2

[56] References Cited

U.S. PATENT DOCUMENTS

| | | | |
|---|---|---|---|
| 1,200,940 | 10/1916 | Henri et al. | 250/437 |
| 2,578,414 | 12/1951 | Foulds | 250/438 |
| 2,669,661 | 2/1954 | Riddiford et al. | 250/437 |
| 3,683,177 | 8/1972 | Veloz | 250/435 |
| 3,731,090 | 5/1973 | Veloz | 250/437 |
| 3,971,947 | 7/1976 | Lambert et al. | 250/437 |
| 4,033,719 | 7/1977 | Conn et al. | 21/102 R |

*Primary Examiner*—Bruce C. Anderson
*Attorney, Agent, or Firm*—Woodard, Weikart, Emhardt & Naughton

[57] ABSTRACT

An ultraviolet water purifier for destroying harmful water-born algae, bacteria, fungus, yeasts and viruses includes a main receptacle which is molded into a shape representative of a boat and may be mounted to the side wall of an aquarium and an ultraviolet light fixture disposed over the open top of the main receptacle for directing ultraviolet radiation into the water which passes through the main receptacle beneath the ultraviolet light fixture. The main receptacle includes a plurality of various sized apertures and corresponding plug members for sealing the apertures closed. Inasmuch as the various plugs are removable, the selection of which apertures to leave open and which apertures to close depends upon the particular flow pattern through the main receptacle which is desired. The main receptacle is divided into three different chambers with a flow passageway adjacent the bottom surface of the main receptacle communicating between each pair of adjacent chambers. By limiting the flow passageway area into and out of the center expansion chamber which is directly beneath the ultraviolet light, the length of exposure of the water within the main chamber to the ultraviolet radiation can be selectively controlled.

12 Claims, 12 Drawing Figures

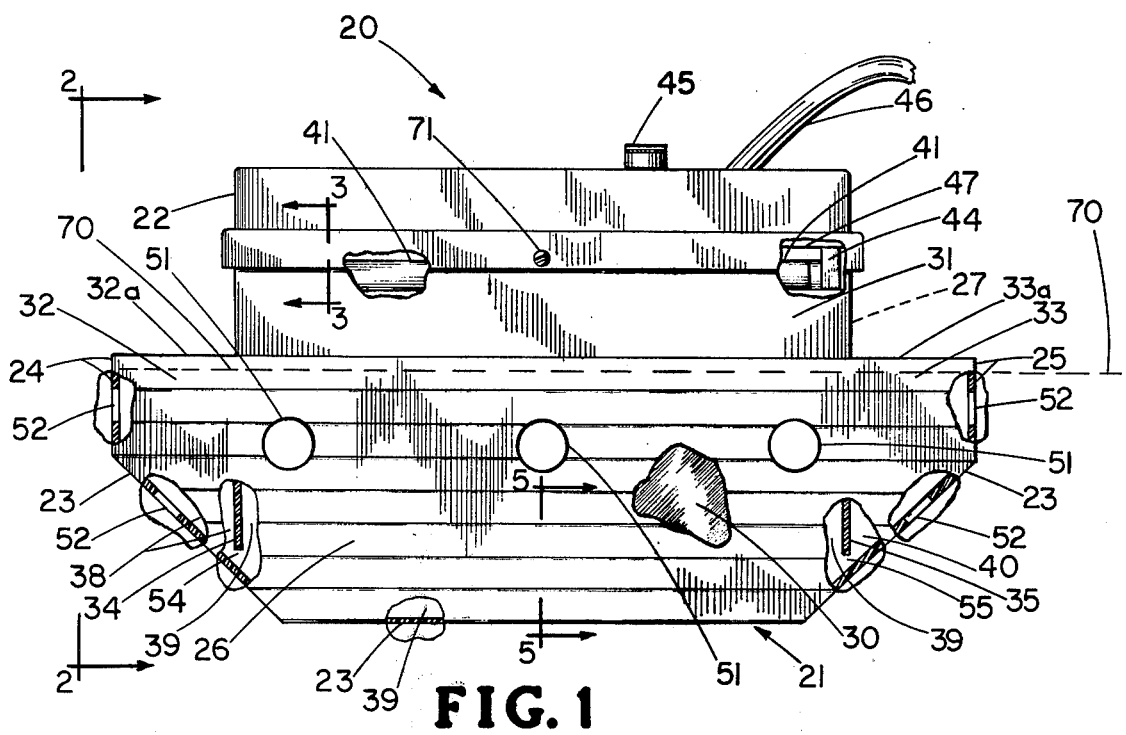
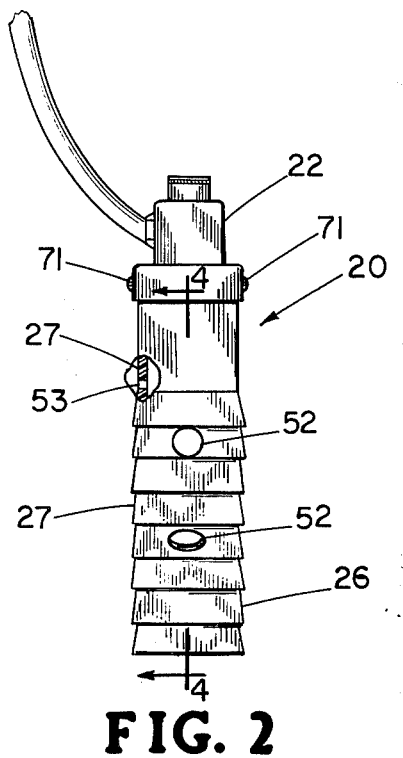
FIG. 1
FIG. 2
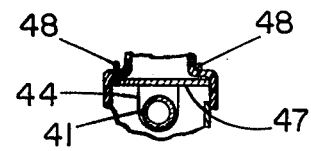
FIG. 3
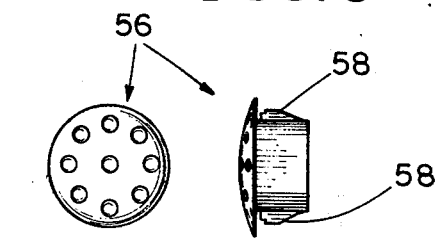
FIG. 6 FIG. 6A
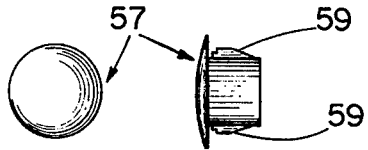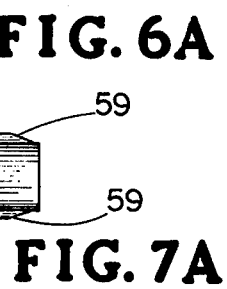
FIG. 7 FIG. 7A

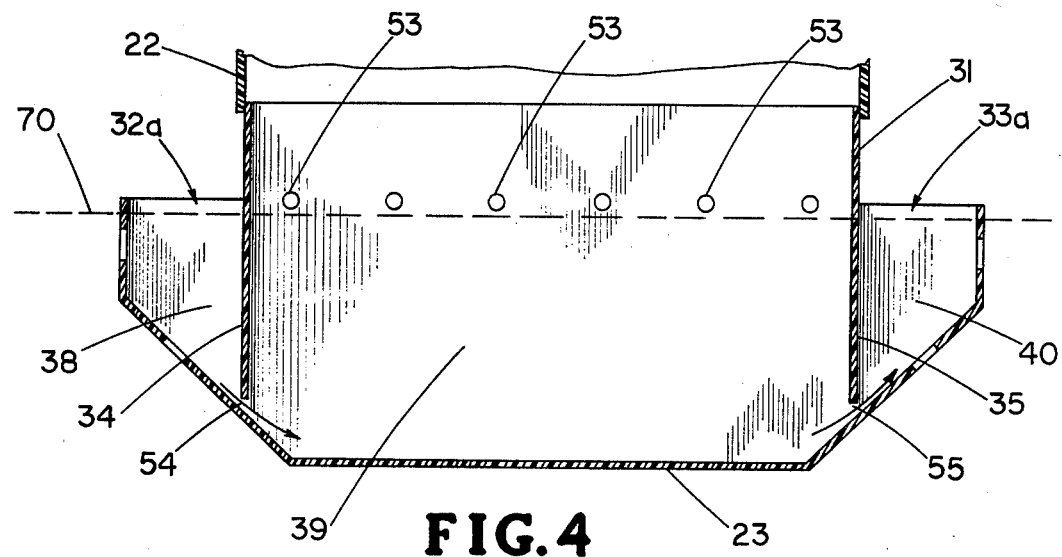
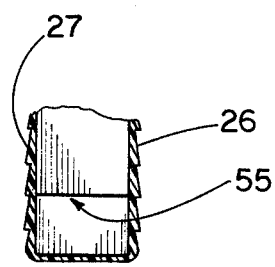
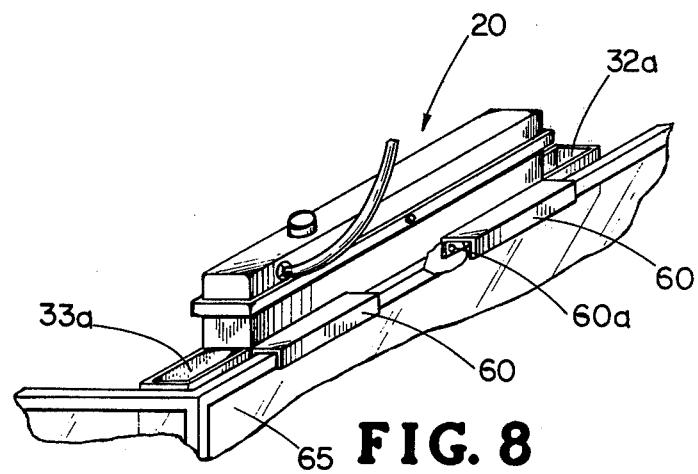
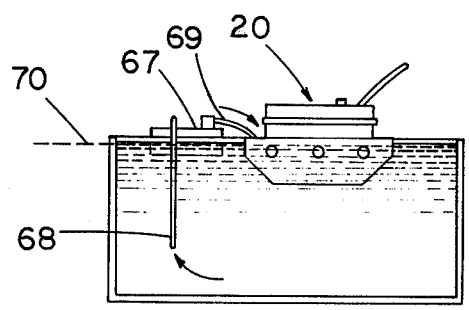
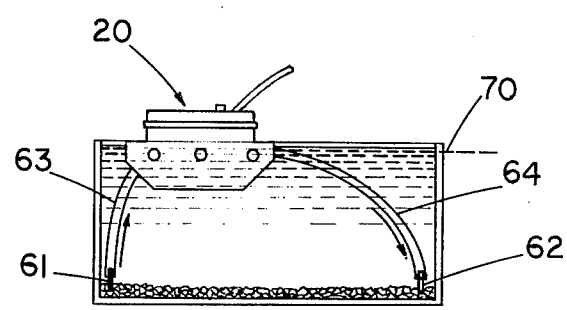

ULTRAVIOLET WATER PURIFIER

BACKGROUND OF THE INVENTION

This invention relates in general to aquarium devices and in particular to aquarium water purifiers.

In certain applications, it is important for water which may be utilized in a process step to be treated or in some manner sterilized. One particular application is with aquariums, and one particular method is to employ ultraviolet radiation directed at a flow stream of water. Ultraviolet radiation, assuming that there is a sufficient wattage level and duration of exposure by the water, is effective to destroy harmful water-born algae, bacteria, fungus, yeasts and viruses.

The following listed patents disclose various designs which have been conceived for sterilizing or purifying water.

| Patent No. | Patentee | Issue Date |
|---|---|---|
| 2,669,661 | Riddiford et al. | 2/16/54 |
| 2,578,414 | Foulds | 12/11/51 |
| 3,683,177 | Veloz | 8/08/72 |
| 4,033,719 | Conn et al. | 7/05/77 |
| 3,971,947 | Lambert et al. | 7/27/76 |

Riddiford et al. discloses an apparatus for treating water wherein the length of exposure to the ultraviolet radiation is controlled and the flow control structural members are readily accessible for cleaning and other servicing.

Foulds discloses a liquid irradiating apparatus wherein all the liquid passing through the apparatus is forced at some time during its passage to traverse a section of very shallow depth, while being exposed to ultraviolet radiation.

Veloz discloses a device for sterilization of water which includes a flexible bag through which the water is pumped and is formed of a material transparent to ultraviolet radiation.

Conn et al. discloses an ultraviolet sterilizer for a recirculating water flow filter system in which the sterilizer includes a low power source of ultraviolet light. Means are employed to thin out an air-water recirculating sheet and the ultraviolet sterilizer is placed a small distance from the sheet in order to irradiate the mixture and create an ozone layer further sterilizing the recirculating mixture.

Lambert et al. discloses an ultraviolet water purifier which includes a plurality of ultraviolet lamps mounted in a cover extending over the purifier and above the water in the purifier with a parabolic reflector directing the rays of the lamp toward the body of water. The purifier is provided with a water inlet and a baffle adjacent thereto having an opening at is base to compel the water entering the purifier to flow directly downward and then to flow through a filter. A baffle plate disposed in the approximate center of the receptacle divides the receptacle into two compartments such that flow between these compartments must pass over the top of the baffle plate. This over-the-top passage assures exposure to the ultraviolet radiation.

Although these various designs and apparata involve the use of ultraviolet light, the only patent of particular relevancy to the subject invention is the Lambert et al. patent for its association with purifying the water of an aquarium. Aquariums are available in a variety of sizes and shapes and one critical consideration in the design of a filtering system as well as a purifying system is the volume of water contained within the aquarium. This water must be filtered and sterilized at a particular rate in order to keep the water clean and sanitary. The problem is one of circulating the entire tank at a certain frequency such as, for example, three tank fulls per hour so that based on the rate of bacteria growth, bacteria will not form in the water to a harmful level before the water is again drawn through the filtering and sterilizing system. Consequently, if there is a 20-gallon tank, the flow rate should be approximately 60 gallons per hour. However, if there is an 80-gallon tank associated with the aquarium, then the flow rate must be 240 gallons per hour. Consequently, when purchasing an aquarium, the filtering system associated with the aquarium must be correspondingly suitably sized. Due to the fixed sizes of the various flow apertures and passageways of the Lambert et al. patent, adaptability to different flow rate requirements is not achievable. Furthermore, since the filter system is included as part of the water purifyer device, the rate of flow across the filter is also controlled by the physical inlet and outlet sizes of the particular purifier device. A related aspect involving the purification of water by the use of ultraviolet radiation is to properly select a bulb wattage level which is sufficient to purify the water flow rate and to control the duration of exposure such that the water-born algae and bacteria can be killed. If the wattage level is too low or the duration of exposure time too short, complete purification will not occur. In the Lambert et al. patent, water from the aquarium is pumped in through tube 12 into inlet 23. From this point it circulates through the filter and then into compartments 34 and 35. The manner in which this water leaves these two compartments is by overflowing through opening 30 which is associated with bracket B and then out through outlet 21. In the event the flow rate is somewhat rapid, this particular design, utilizing baffles, introduces backup eddies and irregular flow patterns and permits certain portions of the circulating water to enter the water purifier chambers and then to be emptied back into the aquarium almost immediately, not allowing sufficient time for sterilization to occur by means of the ultraviolet light. It appears that the flow through filter screens 29 will occur over the entire height of the screen and thus water entering chamber 34 at the top of filter screens 29 would empty into the aquarium with virtually no exposure to the ultraviolet light. An improvement to this design would be to create an ultraviolet water purifier wherein there was an inlet at one end of the light fixture and an outlet at the opposite end such that water flow between inlet and outlet would have to circulate through and beneath the entire length of the ultraviolet light and, if desired, could not leave the purifier device without doing so. It would also be an improvement to the listed patents to provide an ultraviolet water purifier for use with an aquarium which could be readily adapted to either an outside power filter set up as well as an under-gravel filter system. It would also be an improvement to the designs disclosed by the listed patents to provide such an ultraviolet water purifier wherein various flow rates could be selectively controlled by means of changing the cross-sectional area of the low outlets and wherein the points of flow entry as well as the points of flow discharge from the ultraviolet water purifier could be selectively changed. These and related improvements are achieved by the invention which is disclosed herein.

SUMMARY OF THE INVENTION

An ultraviolet water purifier for use with an aquarium according to one embodiment of the present invention comprises a receptacle member including a bottom surface portion and a plurality of side walls extending upwardly and being joined around the bottom surface portion so as to define an open void region, a plurality of apertures extending through the side walls and communicating with the open void region, the apertures providing flow communication from the aquarium through the open void region and back into the aquarium, a plurality of removable plug members received by selected ones of the plurality of apertures for closing the selected ones of the plurality of apertures thereby creating a selected flow path through the open void region, and a source of ultraviolet light disposed atop the open void region.

One object of the present invention is to provide an improved ultraviolet water purifier which is adaptable to various flow patterns and discharge rates.

Related objects and advantages of the present invention will be apparent from the following description.

BRIEF DESCRIPTION OF THE DRAWINGS

FIG. 1 is a fragmentary, front elevation view of an ultraviolet water purifier according to a typical embodiment of the present invention.

FIG. 2 is a fragmentary, side elevation view of the FIG. 1 ultraviolet water purifier as taken along line 2—2 in FIG. 1.

FIG. 3 is a partial section view of the FIG. 1 ultraviolet water purifier as taken along line 3—3 in FIG. 1.

FIG. 4 is a partial front elevation section view of the FIG. 1 ultraviolet water purifier as taken along line 4—4 in FIG. 2.

FIG. 5 is a partial side elevation section view of the FIG. 1 ultraviolet water purifier as taken along line 5—5 in FIG. 1.

FIGS. 6 and 6A are a front view and a side view, respectively, of a vented plug member comprising a portion of the FIG. 1 ultraviolet water purifier.

FIGS. 7 and 7A are a front view and a side view, respectively, of a closed plug member comprising a portion of the FIG. 1 ultraviolet water purifier.

FIG. 8 is a partial perspective view of the FIG. 1 ultraviolet water purifier as attached to a vertical side wall of an aquarium.

FIG. 9 is a front elevation view of the FIG. 1 ultraviolet water purifier coupled to an external filter system.

FIG. 10 is a front elevation view of the FIG. 1 ultraviolet water purifier coupled to an under-gravel filter system.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated an ultraviolet water purifier 20 which includes a main receptacle member 21 and an ultraviolet light fixture 22. Main receptacle member 21 includes a bottom surface portion 23 and four side walls which include left end wall 24, right end wall 25, front wall 26 and rear wall 27. These four side walls are joined to bottom surface portion 23 and to adjacent ones of each other so as to define an open void region 30 within main receptacle member 21. Main receptacle member 21 further includes an upright portion 31, the top edge of which ultraviolet light fixture 22 is fitted into place over and around. The top of upright portion 31 as well as the tops 32a and 33a of outlying portions 32 and 33, respectively, of main receptacle member 21 are open and the left wall 34 of upright portion 31 extends downwardly into open void region 30 at the left end and right side wall 35 of upright portion 31 extends down into open void region 30 at the right end. These downwardly protruding side walls 34 and 35 segment open void region into a left inlet chamber 38, a center expansion chamber 39 and a right inlet chmber 40 (see FIGS. 4 and 5).

Ultraviolet light fixture 22 includes an ultraviolet light bulb 41 and two light bulb sockets 44 which are rigidly secured to fixture 22 at opposite ends of bulb 41. Also included as part of ultraviolet light fixture 22 is a starter 45 and an electrical cord 46 suitable for plugging into a conventional wall outlet. Upright portion 31 is designed and arranged in such a way that when ultraviolet light fixture is placed thereatop, the ultraviolet radiation from ultraviolet light bulb 41 will be directed entirely into center expansion chamber 39. The direction of these ultraviolet rays is enhanced by providing a reflector 47 (see FIG. 3) above ultraviolet light bulb 41 so that ultraviolet radiation directed away from center expansion chamber 39 will be reflected back toward center expansion chamber 39. Due to the characteristics of ultraviolet radiation, the material choice for reflector 47 is critical. For example, some materials which are good reflectors of visible light, such as glass mirrors, are poor reflectors of ultraviolet radiation and one exception to this bright aluminum which is a good reflector of ultraviolet radiation. Consequently, reflector 47 which is secured to fixture 22 by threaded fasteners 48 is fabricated of bright aluminum. Similarly, a suitable ultraviolet light bulb 41 for this application may be a germicidal tube No. G8T5 and a suitable starter is an FS-5.

Disposed within main receptacle member 21 is a plurality of various-sized apertures 51, 52 and 53. Apertures 51 are each approximately one inch in diameter and there are three such apertures disposed across front wall 26 in a substantially evenly spaced manner between left wall 34 and right wall 35. Apertures 52 are each approximately ⅝ inch in diameter and there are four such apertures, one being in left end wall 24, another being in the left end inclined part of bottom surface portion 23 and the other two being correspondingly arranged on the opposite end of main receptacle member 21 in right end wall 25 and the corresponding right end inclined part of bottom surface portion 23. Apertures 53 are each approximately ⅛ inch in diameter and there are six of these apertures disposed along rear wall 27 in an evenly spaced manner at the approximate point that upright portion 31 protrudes from the remainder of main receptacle member 21. As has been previously described, left wall 34 and right wall 35 extend into open void region 30 so as to define left inlet, center expansion and right inlet chambers. It should be noted that left wall 34 and right wall 35 extend downwardly to a location adjacent to bottom surface portion 23, but do not come in contact with bottom surface portion 23 thereby leaving a passageway 54 between left inlet chamber 38 and center expansion chamber 39 and another passageway 55 between center expansion chamber 39 and right inlet chamber 40.

A further feature of this invention is the providing of a plurality of variously arranged and sized plug members which are illustrated in FIGS. 6, 6A, 7 and 7A. Although only two styles have been illustrated by these various figures, it is to be understood that the vented plug 56 of FIGS. 6 and 6A is provided in a one-inch size as well as ⅞ inch size. Similarly, the unvented plug 57 of FIGS. 7 and 7A is provided in a one-inch size, ⅝ inch size and ⅛ inch size. These various sized and arranged plugs are compatible with the diameter sizes of apertures 51, 52 and 53 for the selective opening and closing of these various apertures in order to create a desired flow pattern of the aquarium water through the ultraviolet water purifier 20. The location of passageways 54 and 55 is important in that flow entering chamber 38 is forced downwardly and enters chamber 39 at its lowermost point. Then in order to flow out of chamber 39 back into the aquarium, the volume of water in chamber 39 must flow upwardly to and out apertures 51. Because ultraviolet light transmission is inversely proportional to the water depth, this procedure insures that the water receives the maximum dosage of ultraviolet light. The plurality of plug members are thus utilized to close off or partially close off selected apertures in order to create a desired flow pattern. The length of time that water in chamber 39 is exposed to ultraviolet radiation is a function of the volume of chamber 39 and the selected flow discharge rate controlled by those apertures left open.

If unrestricted flow through a particular aperture is desired, then vented plug 56 would be employed. However, if a particular aperture is desired to be completely closed off, unvented plug 57 would be utilized. The use of vented plug 56 is for those situations where a partial or limited flow is desired through a particular aperture. Each plug 56 includes a pair of spring-acting lock tabs 58 and each plug 57 includes a similar pair of tabs 59 which retain the particular plug in its corresponding aperture. Thus, it can be seen by the selective opening and closing of these various apertures that the volume flow rate through ultraviolet water purifier 20 can be controlled. For example, if a flow path is desired to maximize exposure time, then one of the two apertures 52 at the left end would be closed with plug 57 and the two apertures 52 at the right end would also be closed with plug 57. Similarly, two of the three apertures 51 across front wall 26 would also be closed with plugs 57 utilizing one vented plug 56 in the one remaining aperture 51. Although extended period of exposure is not harmful, it creates an inefficiency which could be resolved by permitting the water to exit from center expansion chamber 39 at a faster rate. In order to accomplish this and shorten the length of exposure, remove one or both plugs 57 and insert vented plug(s) 56 therein. In order to assure that the water flow entering one end will have some time of exposure to the ultraviolet radiation, only one of the two apertures 52 at the left end and only one of the two apertures 52 at the right end are utilized, the other apertures being closed by means of unvented plug 57. Main receptacle member 21 is molded as a single, integral unit from a durable yet somewhat flexible plastic material. This permits wide tolerance variations in the manufacturing phase as well as permitting the various plug members to be easily inserted as well as removed so that a single design water purifier 20 can be adapted to various flow patterns and various aquarium sizes easily. It should also be noted at this point that a wide variety of materials absorb ultraviolet radiation and thus, if such a material is disposed in center expansion chamber 39, the utilization of light fixture 22 ultraviolet output would be inefficient. Consequently, there is nothing within center expansion chamber 39, such as a flow baffle or the like, to absorb any of the ultraviolet light output (see FIG. 4).

Although there are six apertures 53, four of these are utilized for the mounting of a pair of bracket members 60 which have a channel-like shape and are arranged to fit over a vertical wall 65 of an aquarium tank. The bracket members 60 have an inwardly facing depending lip portion which abuts against main receptacle member 21 and is secured thereto by suitable threaded fasteners 60a (see FIG. 8). The providing of six apertures 53 when only four are utilized for the mounting of bracket members 60 permits the bracket members to be arranged in a variety of lateral orientations, again for the purpose of adapting a single ultraviolet water purifier 20 to a variety of uses and aquarium configurations. The remaining two apertures 53 which are not involved in the mounting of bracket members 60 are correspondingly plugged closed with unvented plugs 57 of the ⅛ inch size. In order to generate an efficient flow path through ultraviolet water purifier 20 so that the complete aquarium tank volume can be recycled at a desired hourly rate, some type of pumping system must be connected to purifier 20. Pumping systems which are normally associated with aquariums are typically tied into the filtering system of the aquarium. There are basically two types of such filtering systems, one of which is an under-gravel filter system and the other one of which is an external power filter system. FIG. 10 illustrates one possible connection of an under-gravel filter system to ultraviolet water purifier 20. Suitably sized lengths of flexible tubing are sealingly inserted over the stem portions 61 and 62 of the under-gravel filter system utilizing the air lift to force water to circulate through the purifier and these lengths 63 and 64 of flexible tubing are then inserted into one or the other of the two apertures 52 at each end. In those situations where ultraviolet water purifier 20 is mounted to the aquarium vertical wall such that the left end, as illustrated, or alternatively the right end, is somewhat directly above outlet stem 61, then aperture 52, which is located in bottom surface portion 23, is most appropriate for the tubing connection so as to reduce any sharp bends in tubing length 63. Conversely, when the water purifier 20 is a distance from inlet stem 62, as is illustrated for the right end, tubing length 64 should be inserted into aperture 52 which is in right end wall 25. The alternative arrangement of an external power filter system 67 includes an inlet tube 68 and an outlet branch tube 69. Although inlet tube 68 extends down into the water of the aquarium, outlet branch tube 69 is inserted into either the open top 32a of outlying portion 32 which corresponds with left inlet chamber 38 or the open top 33a of outlying portion 33 which corresponds with right inlet chamber 40. In this arrangement, the two apertures 52 in both the left and right ends would be closed with unvented plugs 57 in order to assure that all the water flow entering ultraviolet water purifier 20 would be exposed to ultraviolet radiation. The adaptability of purifier 20 to either of the most common pumping and filtering systems provides a versatility of use heretofore not available. A further feature of purifier 20 is that bracket members 60 and main receptacle member 21 are suitably arranged so as to place all apertures 51, 52 and 53 below the water level of the aquarium as denoted by water line 70 in FIGS. 1, 4, 9 and 10. This is advantageous from the standpoint of pumping requirements in that it does not require the water which is pumped through purifier 20 to be raised to an extended height above the water level of the aquarium which would require a larger pump and greater system demands. By placing the various apertures of water purifier 20 beneath the water line of the aquarium tank and by providing a plurality of such apertures for various flow connections, the pumping requirements are minimal.

Although the cross-sectional area of one aperture 52 is typically sufficient to accommodate those maximum flow rate velocities associated with larger aquarium tanks, it is important that the cross-sectional area of passageways 54 and 55 also be suitably sized so that water flow will no back up and overflow the chamber on the inlet side of purifier 20. By providing passageways 54 and 55 with a cross-sectional area at least equivalent to that of an aperture 52, the flow path through purifier 20 will not be restricted. The use of walls 34 and 35 and passageways 54 and 55 provide a further feature in that they temporarily retain a certain volume of water within center expansion chamber 39 such that this water has an extended period of exposure time to ultraviolet radiation as the water flows from one or both ends to the outlet vents in apertures 51. Although apertures 51, 52 and 53 have been discussed from the aspect of controlling flow rate and flow volume, a further feature involves the utilization of these various apertures for selecting a particular direction of flow. For example, it is possible to exit the water through any one of the three front apertures 51. Thus, it is apparent that many combinations of both flow volume as well as flow directions are provided by means of these plurality of apertures and their corresponding plugs 56 and 57. The fact that vented plug 56 and unvented plug 57 are removable, provide for easy cleaning in the event contaminant material or particulate material would be collected. This is particularly desirable for vented plug 56 so that its cross-sectional flow through area can be maintained. The disclosed structure also permits light fixture 22 to be easily removed for the replacement of the bulb 41. There is no major disassembly required of ultraviolet water purifier 20 in order to effect such a replacement of the ultraviolet light bulb. The light fixture may be merely removed from the top portion of upright portion 31 once threaded fasteners 71 are removed, the bulb replaced by snapping out of sockets 44 and a new bulb installed and the fixture reinstalled on top of upright portion 31.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An ultraviolet water purifier for use with an aquarium which comprises:
   a receptacle member including a bottom surface portion and a plurality of side walls extending upwardly from and being joined around said bottom surface portion so as to define an open void region;
   a plurality of apertures extending through said side walls and communicating with said open void region, said apertures providing flow communication from said aquarium through said open void region and back into said aquarium;
   a plurality of removable plug members received by selected ones of said plurality of apertures for closing said selected ones of said plurality of apertures thereby creating a selected flow path through said open void region; and
   a source of ultraviolet light disposed atop said open void region.

2. The ultraviolet water purifier of claim 1 which further includes a pair of internal divider walls segmenting said open void region into a left inlet chamber, a center expansion chamber and a right inlet chamber, adjacent ones of said chambers having flow communication means therebetween.

3. The ultraviolet water purifier of claim 2 wherein said left inlet chamber communicating with said center expansion chamber by way of a first passageway extending through one of said internal divider walls at a location adjacent said bottom surface portion, said center expansion chamber communicating with said right inlet chamber by way of a second passageway extending through the other one of said internal divider walls at a location adjacent said bottom surface portion.

4. The ultraviolet water purifier of claim 3 which further includes means for attaching said water purifier to the top edge of said aquarium, said attaching means and said receptacle member suitably arranged such that selected flow path through said open void region is entirely beneath the water level in said aquarium.

5. The ultraviolet water purifier of claim 2 which further includes an aluminum reflector suitably arranged about said source of ultraviolet light for reflecting part of said ultraviolet light into said open void region.

6. The ultraviolet water purifier of claim 5 wherein two of said plurality of apertures being suitably positioned to connect said left inlet chamber with the interior of said aquarium, a different two of said plurality of apertures being suitably positioned to connect said right inlet chamber with the interior of said aquarium, a different three of said plurality of apertures being suitably positioned to connect said center expansion chamber with the interior of said aquarium.

7. The ultraviolet water purifier of claim 1 wherein certain ones of said plurality of apertures being suitably sized and arranged to couple to the inlet and outlet of a conventional under-gravel filter system associated with an aquarium.

8. The ultraviolet water purifier of claim 7 which further includes a flow path through said open void region from the aperture associated with said filter system outlet to the aperture associated with said filter system inlet, said flow path being entirely beneath the water level in said aquarium.

9. The ultraviolet water purifier of claim 8 which further includes a pair of internal divider walls segmenting said open void region into a left inlet chamber, a center expansion chamber and a right inlet chamber, adjacent ones of said chambers having flow communication means therebetween.

10. The ultraviolet water purifier of claim 9 which further includes an aluminum reflector suitably arranged about said source of ultraviolet light for reflecting part of said ultraviolet light into said open void region.

11. The ultraviolet water purifier of claim 10 wherein selected ones of said plurality of removable plug members are provided with a plurality of vent openings therethrough, the remainder of said plurality of removable plug members being closed.

12. An ultraviolet water purifier for use with an aquarium which comprises:
- a receptacle member including a bottom surface portion and a plurality of side walls extending upwardly from and being joined around said bottom surface portion so as to define an open void region;
- a plurality of apertures extending through said side walls and communicating with said open void region, said apertures providing flow communication from said aquarium through said open void region and back into said aquarium;
- a pair of divider walls disposed within said open void region between said side walls, said divider walls defining a center expansion chamber portion of said open void region, said center expansion chamber portion being free of any intermediate surfaces disposed therein; and
- a source of ultraviolet light disposed atop said center expansion chamber portion.

* * * * *